US009092455B2

(12) United States Patent
Canan et al.

(10) Patent No.: US 9,092,455 B2
(45) Date of Patent: Jul. 28, 2015

(54) IMAGE CURATION

(75) Inventors: Ramona P. Canan, Bellevue, WA (US); Dahey Yoo, Bellevue, WA (US); Chunkit J. Chan, Redmond, WA (US); Daniel Rosenstein, Issaquah, WA (US); Ivan D. Romashka, Seattle, WA (US); Ian N. Peth, Seattle, WA (US); Adam K. Avery, Seattle, WA (US); Carmen Zlateff, Kirkland, WA (US); Bradley G. Weed, Kirkland, WA (US); Omkar Anand Mehendale, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 13/551,297

(22) Filed: Jul. 17, 2012

(65) Prior Publication Data

US 2014/0022265 A1   Jan. 23, 2014

(51) Int. Cl.
G06F 17/30 (2006.01)
G06K 9/00 (2006.01)
(52) U.S. Cl.
CPC .................. G06F 17/30244 (2013.01)
(58) Field of Classification Search
CPC .............. G06F 17/30; G06F 17/30244; G06F 17/30247; G06K 9/00677
See application file for complete search history.

(56) References Cited

U.S. PATENT DOCUMENTS

| | | | |
|---|---|---|---|
| 5,623,666 A | 4/1997 | Pike et al. | |
| 6,901,403 B1 | 5/2005 | Bata et al. | |
| 6,950,535 B2 | 9/2005 | Sibayama et al. | |
| 7,336,887 B2 | 2/2008 | Satoh et al. | |
| 7,366,742 B1 | 4/2008 | Umbehocker et al. | |
| 7,613,689 B2 | 11/2009 | Arrouye et al. | |
| 7,752,265 B2 | 7/2010 | Svendsen et al. | |
| 7,856,380 B1 | 12/2010 | Latin-Stoermer et al. | |
| 7,882,115 B2 | 2/2011 | Hirsch | |
| 7,966,184 B2 | 6/2011 | O'Conor et al. | |
| 7,987,490 B2 | 7/2011 | Ansari et al. | |
| 7,992,103 B2 | 8/2011 | Gusmorino et al. | |
| 8,060,514 B2 | 11/2011 | Arrouye et al. | |
| 8,094,948 B2 * | 1/2012 | Jain et al. | 382/225 |
| 8,266,115 B1 | 9/2012 | Park et al. | |
| 8,285,810 B2 | 10/2012 | Svendsen et al. | |
| 8,296,380 B1 | 10/2012 | Kelly et al. | |
| 8,341,037 B2 | 12/2012 | Bachman et al. | |

(Continued)

OTHER PUBLICATIONS

"Final Office Action", U.S. Appl. No. 13/229,554, Dec. 4, 2013, 19 pages.

(Continued)

Primary Examiner — Joni Richer
(74) Attorney, Agent, or Firm — Bryan Webster; Kate Drakos; Micky Minhas

(57) ABSTRACT

Image curation techniques are described. In one or more implementations, one or more modules are launched for execution on a computing device. Responsive to the launch, criteria are generated automatically and without user intervention through execution of the one or more modules by a computing device. Images are curated using the generated criteria automatically and without user intervention through execution of the one or more modules, the curated images identified from a plurality of different image sources that are associated with a user. The curated images are caused to be displayed by a display device of the computing device automatically and without user intervention through execution of the one or more modules.

20 Claims, 7 Drawing Sheets

(56) References Cited

U.S. PATENT DOCUMENTS

| | | |
|---|---|---|
| 8,402,071 B2 | 3/2013 | Skillcorn |
| 8,464,133 B2 | 6/2013 | Grube et al. |
| 8,554,784 B2 | 10/2013 | Nurminen et al. |
| 8,612,888 B2 * | 12/2013 | Pennington et al. ......... 715/810 |
| 8,634,674 B2 * | 1/2014 | Hanechak .................... 382/276 |
| 8,756,510 B2 | 6/2014 | Bhumkar et al. |
| 2003/0033402 A1 | 2/2003 | Battat et al. |
| 2004/0024580 A1 | 2/2004 | Salmonsen et al. |
| 2004/0141637 A1 | 7/2004 | Bacus et al. |
| 2005/0105884 A1 | 5/2005 | Satoh et al. |
| 2005/0251566 A1 | 11/2005 | Weel |
| 2006/0107056 A1 | 5/2006 | Bhatt et al. |
| 2006/0146765 A1 | 7/2006 | Van De Sluis et al. |
| 2006/0195481 A1 | 8/2006 | Arrouye et al. |
| 2006/0271691 A1 | 11/2006 | Jacobs et al. |
| 2007/0005334 A1 | 1/2007 | Salmonsen |
| 2007/0033225 A1 | 2/2007 | Davis |
| 2007/0033279 A1 | 2/2007 | Battat et al. |
| 2007/0050467 A1 | 3/2007 | Borrett et al. |
| 2007/0169165 A1 | 7/2007 | Crull et al. |
| 2007/0208687 A1 | 9/2007 | O'Conor et al. |
| 2007/0300158 A1 | 12/2007 | Kasperkiewicz et al. |
| 2008/0040359 A1 | 2/2008 | Arrouye et al. |
| 2008/0092054 A1 | 4/2008 | Bhumkar et al. |
| 2008/0120571 A1 | 5/2008 | Chang et al. |
| 2009/0183077 A1 * | 7/2009 | Hakim et al. ................ 715/720 |
| 2009/0198581 A1 | 8/2009 | Lidestri |
| 2009/0265416 A1 | 10/2009 | Svendsen et al. |
| 2010/0005168 A1 | 1/2010 | Williams et al. |
| 2010/0005397 A1 | 1/2010 | Lanahan et al. |
| 2010/0023691 A1 | 1/2010 | Shin |
| 2010/0042648 A1 | 2/2010 | Cannon et al. |
| 2010/0094934 A1 | 4/2010 | Svendsen et al. |
| 2010/0191827 A1 | 7/2010 | Martin |
| 2010/0262582 A1 | 10/2010 | Garcia-Ascanio |
| 2010/0281382 A1 | 11/2010 | Meaney et al. |
| 2010/0299417 A1 | 11/2010 | Austin et al. |
| 2010/0299697 A1 | 11/2010 | Austin et al. |
| 2010/0332456 A1 | 12/2010 | Prahlad et al. |
| 2011/0029635 A1 | 2/2011 | Shkurko et al. |
| 2011/0087531 A1 | 4/2011 | Winters et al. |
| 2011/0087674 A1 | 4/2011 | Schokking et al. |
| 2011/0099199 A1 * | 4/2011 | Stalenhoef et al. .......... 707/770 |
| 2011/0106798 A1 | 5/2011 | Li et al. |
| 2011/0154198 A1 | 6/2011 | Bachman et al. |
| 2011/0161174 A1 | 6/2011 | Simms et al. |
| 2011/0161409 A1 | 6/2011 | Nair et al. |
| 2011/0231192 A1 | 9/2011 | O'Conor et al. |
| 2011/0231745 A1 | 9/2011 | Levesque et al. |
| 2011/0283185 A1 | 11/2011 | Obasanjo |
| 2011/0289421 A1 | 11/2011 | Jordan et al. |
| 2012/0030213 A1 | 2/2012 | Arrouye et al. |
| 2012/0078953 A1 | 3/2012 | Araya |
| 2012/0113964 A1 | 5/2012 | Petersen et al. |
| 2012/0154419 A1 * | 6/2012 | Nagata et al. ................ 345/581 |
| 2012/0185880 A1 | 7/2012 | Jalon et al. |
| 2012/0208168 A1 | 8/2012 | Atkinson et al. |
| 2012/0271823 A1 | 10/2012 | Asikainen et al. |
| 2012/0290654 A1 | 11/2012 | Detwiller et al. |
| 2012/0301039 A1 * | 11/2012 | Maunder et al. ............. 382/225 |
| 2012/0331141 A1 | 12/2012 | Carter et al. |
| 2013/0004073 A1 * | 1/2013 | Yamaji et al. ................ 382/173 |
| 2013/0024424 A1 | 1/2013 | Prahlad et al. |
| 2013/0027613 A1 | 1/2013 | Kim et al. |
| 2013/0047123 A1 | 2/2013 | May et al. |
| 2013/0067346 A1 | 3/2013 | Rosenstein |
| 2013/0091204 A1 | 4/2013 | Loh et al. |
| 2013/0148864 A1 * | 6/2013 | Dolson et al. ................ 382/115 |
| 2013/0191767 A1 | 7/2013 | Peters et al. |

OTHER PUBLICATIONS

"Can I see a Skydrive folder in Windows as a computer disk?", retrieved from http://forums.techarena.in/technology-internet/1386082.htm on Aug. 5, 2011, 3 pages.

"Windows Live Logo Windows Live SkyDrive", retrieved from http://toostep.com/trends/india-one-three-chosen-to-test-skydrive-online-storage on Aug. 5, 2011, 2 pages.

"Windows Phone—Pictures Hub", retrieved from http://www.microsoft.com/windowsphone/en-gb/howto/wp7/pictures/pictures-hub.aspx on Jun. 21, 2012, (2012), 2 pages.

Snavely, Noah et al., "Modeling the World from Internet Photo Collections", International Journal of Computer Vision, vol. 80, Issue 2, Available at <http://phototour.cs.washington.edu/ModelingTheWorld_ijcv07.pdf>,(Nov. 2008), 22 pages.

"Non-Final Office Action", U.S. Appl. No. 13/229,554, (Aug. 16, 2013),16 pages.

"PCT Search Report and Written Opinion", Application No. PCT/US2013/050583, (Oct. 18, 2013), 8 pages.

"Non-Final Office Action", U.S. Appl. No. 13/229,554, Nov. 17, 2014, 25 pages.

"Final Office Action", U.S. Appl. No. 13/229,554, Feb. 27, 2015, 29 pages.

* cited by examiner

IMAGE CURATION

BACKGROUND

The amount of images with which a user captures and interacts with in everyday life is ever increasing. For example, with the addition of camera functionality to a mobile phone, a user may readily capture a multitude of images, e.g., still images and videos. Additionally, the user may receive images from a variety of other users that were captured on their mobile phones.

These images may be shared using a variety of different services, including email, photo sharing sites, social networks, and so on. Consequently, even a typical user may have a large quantity of images spread out amongst a variety of different sources, which may make it difficult for a user to locate particular images of interest.

SUMMARY

Image curation techniques are described. In one or more implementations, one or more modules are launched for execution on a computing device. Responsive to the launch, criteria are generated automatically and without user intervention through execution of the one or more modules by a computing device. Images are curated using the generated criteria automatically and without user intervention through execution of the one or more modules. The curated images are identified from a plurality of different image sources that are associated with a user. The curated images are caused to be displayed by a display device of the computing device automatically and without user intervention through execution of the one or more modules.

In one or more implementations, one or more computer-readable storage media comprise instructions stored thereon that, responsive to execution by a computing device, causes the computing device to perform operations automatically and without user intervention. The operations include generating criteria, identifying images that are associated with a user from a plurality of different image sources using the generated criteria, selecting a subset of the identified images for display, matching one or more of the selected subset of images to positions in an image layout, and replacing display of at least one of the selected subset of images in the image layout with another one of the selected subset of images.

In one or more implementations, a system comprises one or more modules implemented at least partially in hardware, the one or more modules configured to perform operations. The operations include curating images using criteria that are generated automatically and without user intervention, the curated images identified from a plurality of different image sources that are associated with a user. The operations also include causing the curated images to be displayed by a display device automatically and without user intervention, the curated images displayed according to a layout such that at least one image from a first image source is displayed concurrently with a second image from a second image source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Users may have images, both still and video, stored in a variety of different locations. This may include different devices of the user (e.g., a mobile phone, tablet, desktop computer), different services (e.g., social networks, photo sharing services), and so on. Consequently, it may be difficult for a user to access these images in an efficient manner.

Image curation techniques are described. In one or more implementations, modules may be utilized to automatically curate (e.g., identify and organize) images from a variety of different image sources. The modules, for instance, may be configured to generate criteria that may be used to identify "interesting" images from a collection automatically and without user intervention. Techniques may also be employed to select a subset of the images for display from this pool of potentially interesting images. The modules may also be employed to support automatic placement of the images of output, such as in a "multi-up" layout for viewing by the user and may include replacement of images and subsequent generation of additional criteria. In this way, a user may be given access to images from a wide range of sources in an efficient manner. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
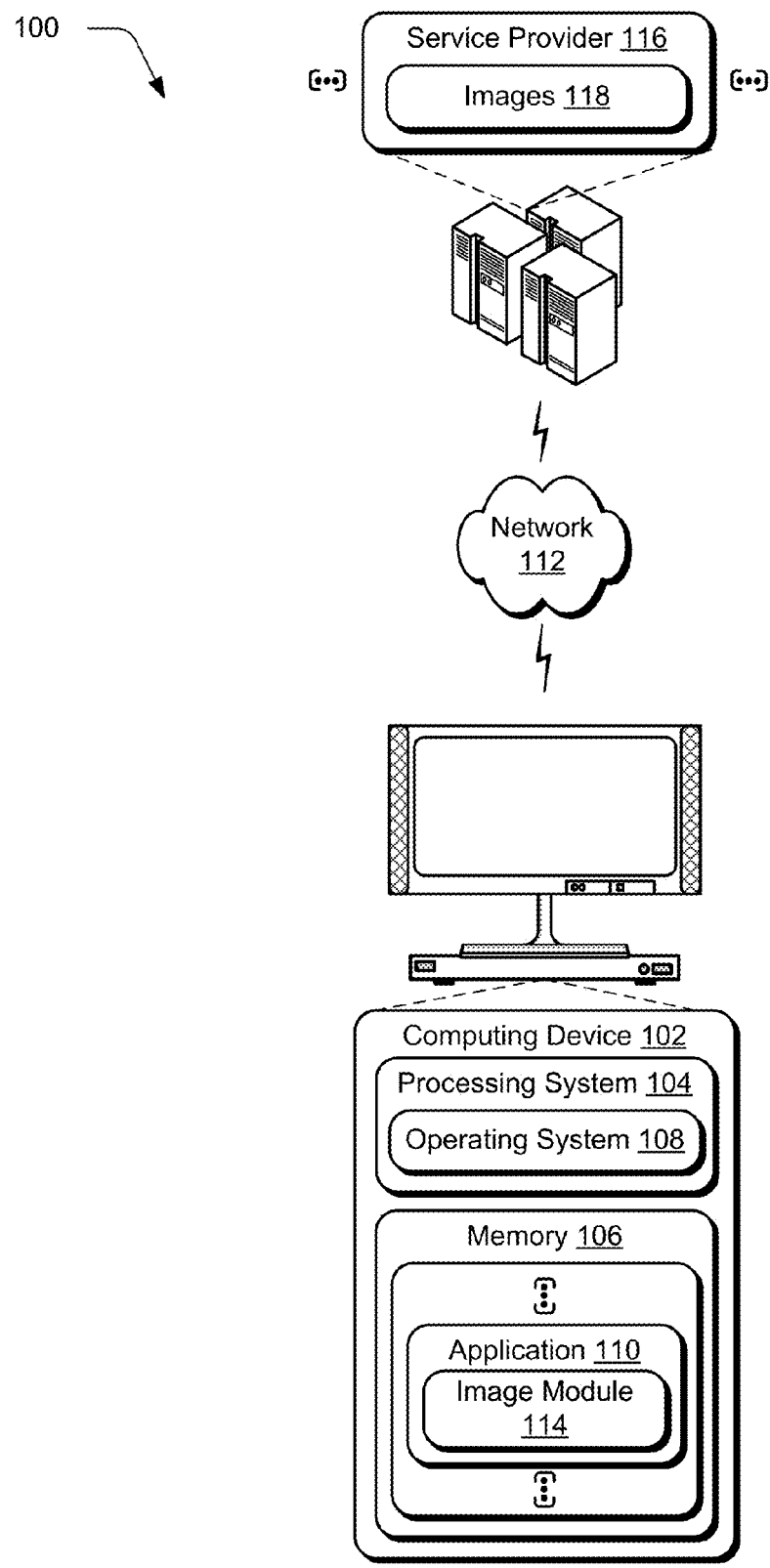
FIG. 1 is an illustration of an environment in an example implementation that is operable to employ image curation techniques described herein.

FIG. 1 is an illustration of an environment 100 in an example implementation that is operable to employ techniques described herein. The illustrated environment 100 includes a computing device 102 having a processing system 104 and a computer-readable storage medium that is illustrated as a memory 106 although other configurations are also contemplated as further described below in relation to FIG. 7.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, network 112, and/or display device functionality of the computing device 102 such that the applications 110 may be written without knowing "how" this underlying functionality is implemented. The application 110, for instance, may provide data to the operating system 108 to be rendered and displayed by the illustrated display device without understanding how this rendering will be performed. The operating system 108 may also represent a variety of other functionality, such as to manage a file system and user interface that is navigable by a user of the computing device 102, manage a user login to provide access to resources that are specific to the user, and so forth.

The application 110 is illustrated as including an image module 114 that is representative of functionality relating to management of images. Although illustrated as part of the application 110, functionality of the image module 114 may be implemented in a variety of ways, such as part of the operating system 108, as a stand-alone application, distributed across an environment, employed as part of a network service, and so on, further examples of which are illustrated in relation to FIG. 7.

One example of functionality relating to management of images by the image module 114 involves image curation. This may include generation of criteria that may be utilized to locate potentially "interesting" images, which may be performed automatically and without user intervention by the image module 114. Examples of criteria may include time-based criteria (e.g., August), people-based criteria (e.g., the user, the user's children, friends of the user), location-based criteria (e.g., a location spot), pixel-based criteria (e.g., pixels of a particular color), and others.

The image module 114 may also be configured to access images from a variety of different sources. This may include storage that is local to the computing device 102, e.g., the memory 106. This may also include image sources that are accessible via the network 112. An example of this is one of a plurality of different service providers 116 that are configured to support network services involving images 118. This may include social networks, image sharing service, image storage services, and so on. Thus, the image module 114 may be configured to support interaction with images a variety of different sources and may do so automatically and without user intervention, an example of which is described in relation to the following figure.

Figure 2:
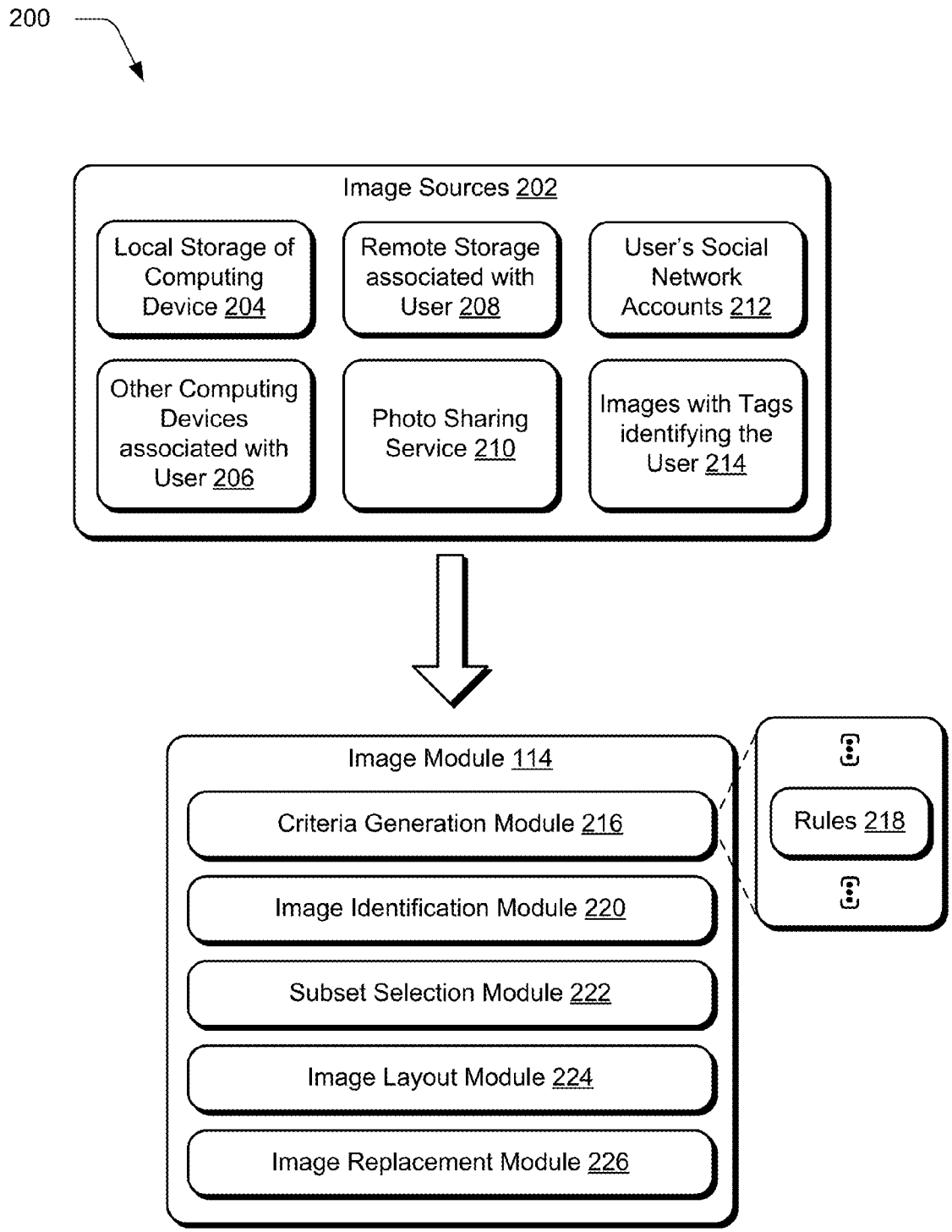
FIG. 2 depicts a system in an example implementation in which an image module of FIG. 1, which is shown in greater detail, is configured to access images from a variety of different image sources.

FIG. 2 depicts a system 200 in an example implementation in which the image module 114, which is shown in greater detail, is configured to access images from a variety of different image sources. As previously described, the image module 114 may access images from a variety of different image sources 202. One such illustrated example includes local storage of a computing device 204, such as the computing device 102 that executed the image module 114. Local storage of the computing device 204, for instance, may include one or more folders in which images are maintained.

Figure 7:
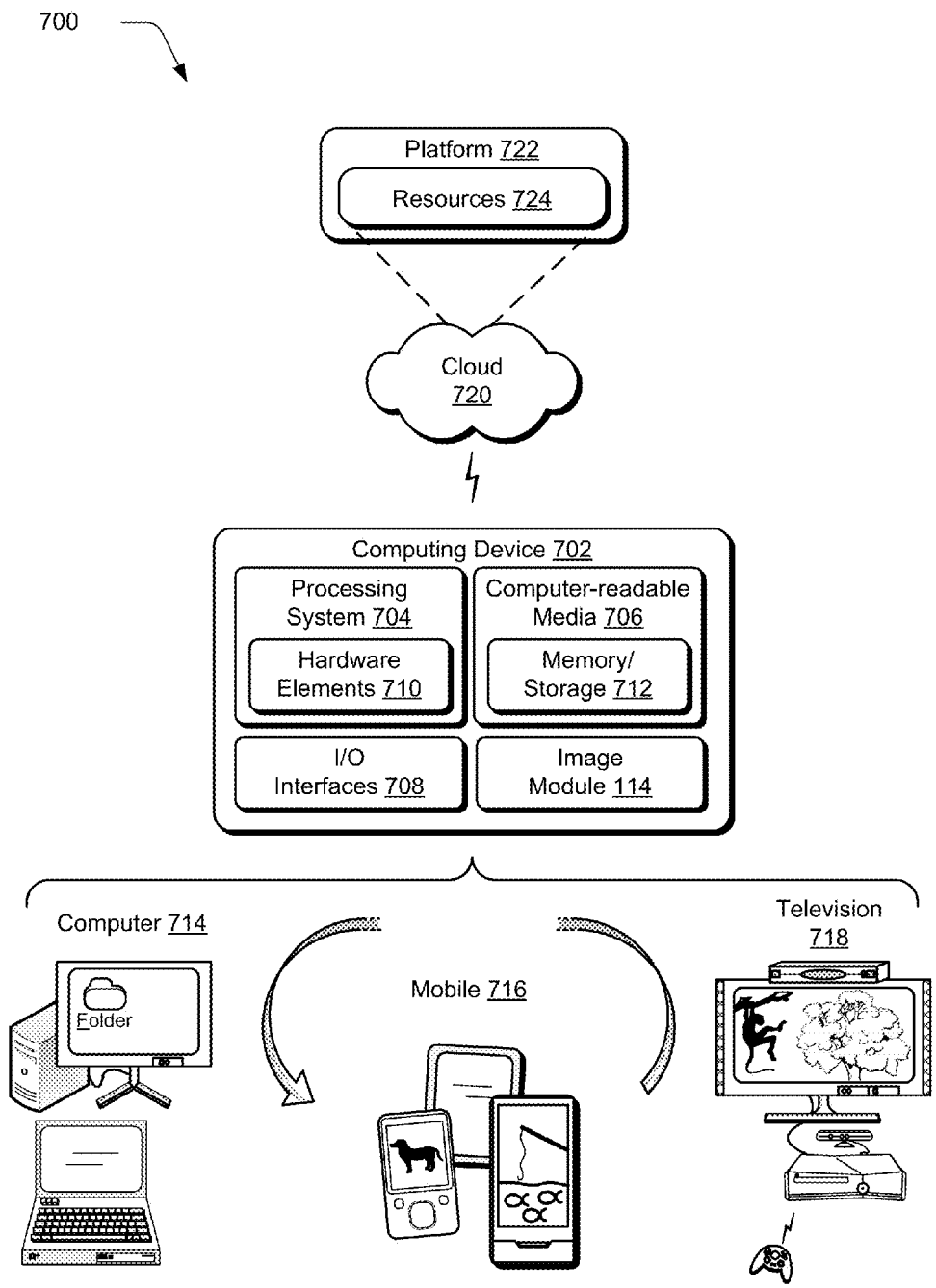
FIG. 7 illustrates an example system including various components of an example device that can be implemented as any type of computing device as described with reference to FIGS. 1-6 to implement embodiments of the techniques described herein.

In another example, the image source 202 may include other computing devices associated with the user 206. The user, for instance, may use a mobile phone, tablet computer, game console, and desktop computer as shown in FIG. 7 to store images. Accordingly, the image module 114 may be configured to access images from these other devices, such as through a login procedure using credentials accessible to the image module 114.

In a further example, an image source 202 includes remote storage that is associated with the user 208. This may include storage that is made available to a user to act as storage that is accessible over the network 112, an example of which is "SkyDrive" (SkyDrive is a trademark of the Microsoft Corp., Redmond, Wash.). In yet a further example, an image source 202 may include a photo sharing service 210 that is accessible remotely over the network 112. The photo sharing service 210 may be configured to support uploads of images which may then be made accessible to the user (e.g., as a backup) as well as shared with other users. The other users, for instance, may be granted permission to access the images through receipt of an email containing a link, through specification of an email address, and so forth.

Image sources 202 may also include a user's social network accounts 212. Images, for instance, may be uploaded by the user for sharing with other users (e.g., "friends" of the user) and/or shared with the user from other users via the social network service. Thus, the "friend" or other relationship that is specified may be used to permission access to the images by the user with other users and vice versa. In an additional example, images with tags identifying the user 214 may be used as an image source 202, such as images that may be located based on the tags that are stored as part of metadata of the image or otherwise. Thus, the image module 114 may be used to access images from a wide variety of different sources, other examples of which are also contemplated.

Regardless of the image source 202, the image module 114 may utilize a variety of different techniques to identify images that may be of potential interest to a user. The image module 114, for instance, may employ a criteria generation module 216 that is representative of functionality to generate criteria that may be utilized to identify a collection of images that may be potentially interesting. This generation may be performed automatically and without user intervention, such as responsive to a launch of the application 110, selection of an image viewing mode supported by the operating system 108, and so on.

A variety of different criteria may be generated by the criteria generation module 216. This may include time-based criteria, which may include images from a particular timeframe across a plurality of years, e.g., week, holiday, month, season, year, and so on. In another example, this may include "recent" images that were taken, edited and/or made accessible in a predefined amount of time, received a recent coment, and so on. Thus, the time-based criteria may be compared to metadata associated with the image to identify the image as further described below.

In another example, the criteria may be based on people included in the images. The images, for instance, may include metadata (e.g., tags) that describes people included in the images. Other techniques are also contemplated, such as through image analysis to identify similar users in a plurality of images. In a further example, the criteria may be location based. For instance, the images may be geo-tagged such that coordinates are included in metadata associated with the image that describes where the image was captured. Thus, in these examples metadata may be leveraged to define criteria to be used to identify images of interest.

Other examples are also contemplated in which other criteria not defined in the metadata are used. For example, pixels of the image itself may be utilized to define criteria, such as based on color, identification of particular users, locations, landmarks, and so on. Additionally, quality of the image may also be used as a criterion, such as whether the image is blurry, a video is stable, and other visual aesthetics.

The criteria generation module 216 may also employ rules 218 in the generation of the criteria that are to be used to identify potentially interesting images. The rules 218, for example, may specify a replacement of criteria such that a same criterion is not used for successive outputs, may employ heuristics that alter the criteria based on monitored user interaction, and so forth. The rules 218, for instance, may cause generation of criteria to be based at least in part on criteria that was utilized in a previous output such that the previous criteria are not repeated. Thus, the criteria generation module 216 may employ a variety of different techniques to generate criteria automatically and without user intervention.

The criteria may then be used by an image identification module 220 of the image module 114 to identify images that comply with the generated criteria. This identification may be performed automatically and without user intervention by the module in a variety of ways. For example, the image identification module 220 may be configured to examine metadata of image sources 202 located remotely via a network 112 without downloading the actual images, thereby saving network bandwidth and improving efficiency. Other examples are also contemplated in which downloading is performed. In this way, the image identification module 220 may identify images that correspond to the criteria generated by the criteria generation module 216.

Once an interesting collection has been identified by the image identification module 220, such as January Moments, analysis is done on the collection by the subset selection module 222 automatically and without user intervention in order to identify the subset of images that are to be displayed. For example, the subset selection module 222 may employ algorithms with specific probability curves to the collection to ensure that an even distribution across the collection is obtained. To avoid clustering (e.g., displaying three photos that are variations of the same group shot), images with "date taken" fields may be leveraged such that images that are "far enough apart" may be chosen. Images with a desired mix of landscape versus portrait orientations as dictated by the multi-up layout may also be selected by the subset selection module 222. In a further example, the subset selection module 222 may ensure that different image sources are leveraged, e.g., so that each of the images is not obtained from a single source.

At this point, the image module 114 has identified a curated subset of images that are to be displayed. The image module 114 may then employ an image layout module 224 to populate the images in a layout for display. The layout may take a variety of different forms, such as a slideshow, support concurrent view of a plurality of the images, and so on. This layout may be saved, shared with other users, printed, and so on. Further, the layout may involve resizing, cropping, and other modifications of the images for inclusion in the layout, may leverage an image replacement module 226 to rotate through a display of the images in the subset, and so on as further described in relation to the following figure.

Figure 3:
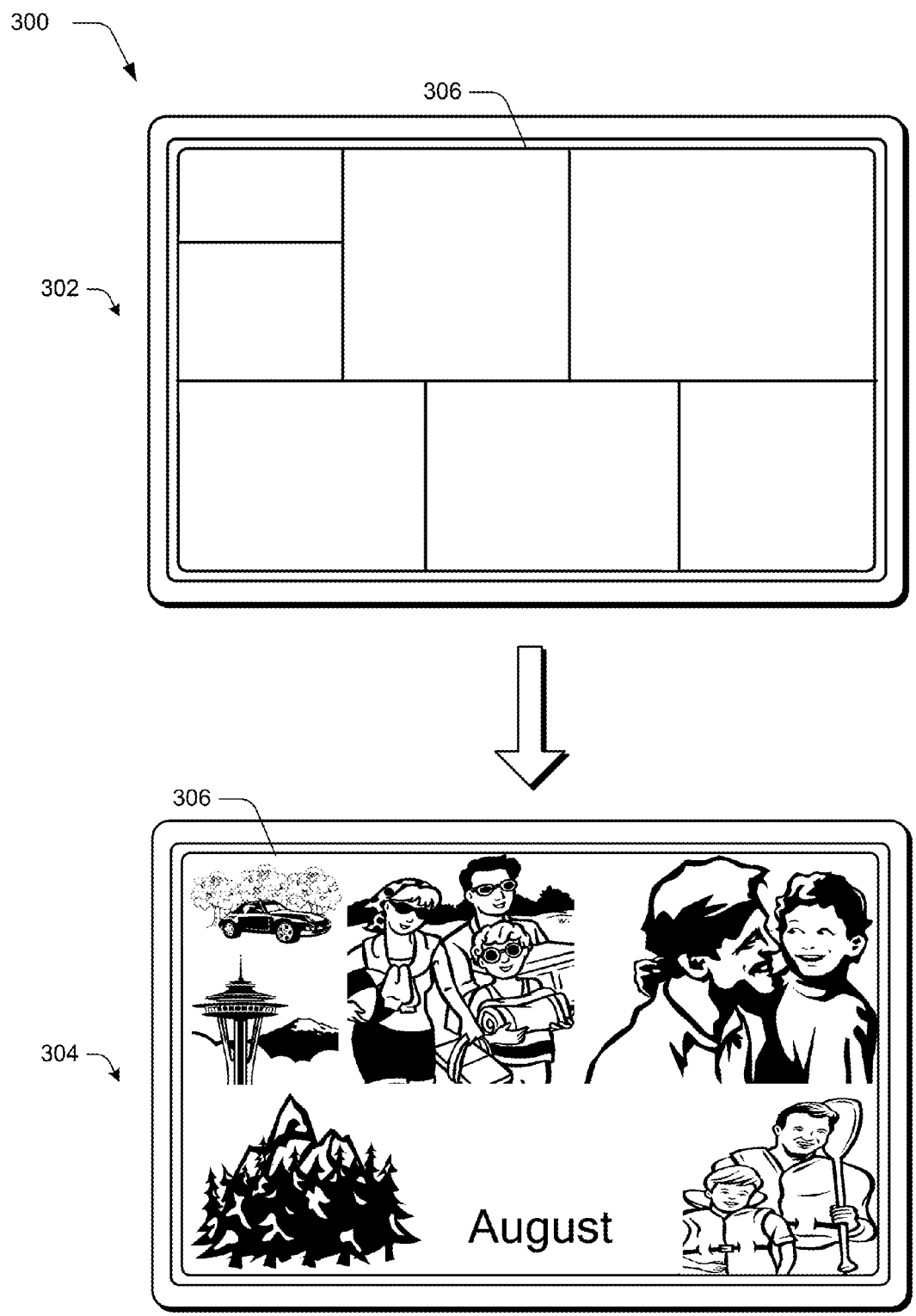
FIG. 3 depicts an example implementation in which an image module of FIG. 2 employs an image layout module to populate a layout.

FIG. 3 depicts an example implementation 300 in which the image module 114 of FIG. 2 employs an image layout module 224 to populate a multi-up layout. The example implementation 300 is shown using first and second stages 302, 304. At the first stage 302, an unpopulated layout 306 is shown as being configured to include a plurality of images taken from the subset for display by a display device of the computing device 102 of FIG. 1. As illustrated, the layout 306 may include different sizes and orientations for images that are to be included in the layout.

At the second stage 304, the image layout module 224 has populated the layout 306. This may include application of rules to determine a position in the layout for a given image. These rules may include matching landscape images to landscape layout positions and matching portrait images to portrait layout positions, arrangement of images so that similar images are spaced apart in the layout, and so on.

In the illustrated example, the images are shown such that preconfigured borders are not visible to a user when viewing the layout. For instance, pixels of the images may be displayed proximal to each other such that pixels from another source are not displayed between the pixels of adjacent images. Naturally, other implementations are also contemplated, including implementations in which borders are shown as illustrated in the first step 302. Also, in the illustrated example the layout is shown as being displayed in an immersive or modern shell that does not involve display of "chrome" such as windows, menus, sliders, and so on although other examples are also contemplated.

Once an initial placement of images has filled the layout, new images from the curated subset may be used to replace existing images (e.g., one at a time, a subset, all at the same time, and so on) using the same or different layout-matching rules described above by the image replacement module 226. In the illustrated example, the layout 306 also includes a description of at least one criterion that was used to identify the image, e.g., "August" in the illustrated example.

Once display of the curated subset has completed, an additional curated subset may be selected and displayed along with a new description, if applicable. In this way, new curated images may be used to replace the old curated images, e.g., one at a time, in subsets, and so on. Thus, as the user continues to watch the layout, the user is presented with sequential curated sets of their memories as recorded by the images.

As previously described, the image module 112 may employ rules in selection of a next curated set of images to ensure that identical sets are not shown consecutively. Rules may also be employed to re-analyze collections and choose different subsets of photos once a given set has been viewed. For example, after "January Moments" is viewed, the full population of images from January may be re-analyzed and a new subset chosen such that the next time "January Moments" appears, different images are chosen. A variety of other examples are also contemplated, further discussion of which may be found in relation to the following section.

Example Procedures

The following discussion describes image curation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
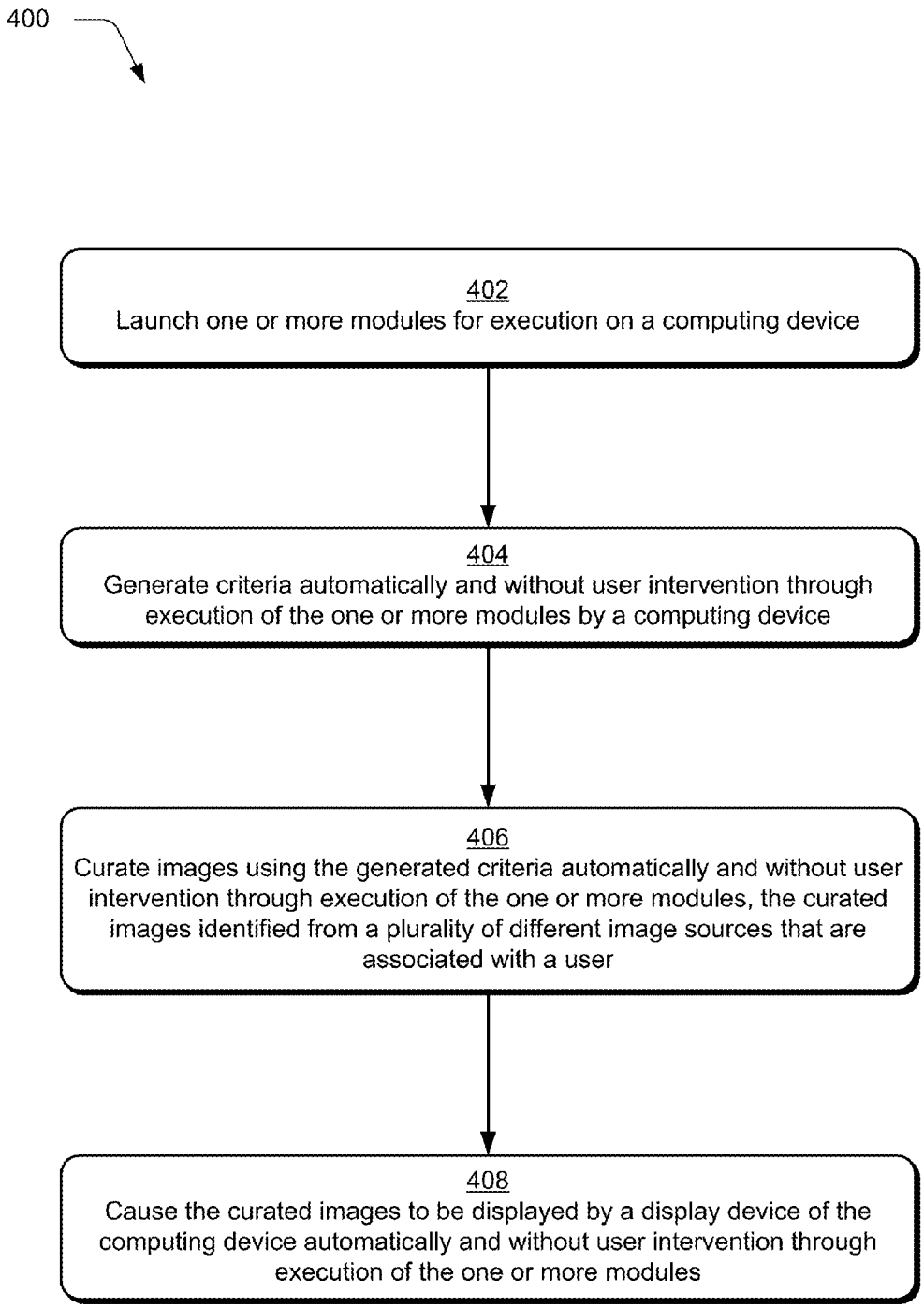
FIG. 4 is a flow diagram depicting a procedure in an example implementation in which images are displayed automatically and without user intervention based on criteria that are automatically generated, the display performed responsive to launching of an application.

FIG. 4 depicts a procedure 400 in an example implementation in which images are displayed automatically and without user intervention based on criteria that is automatically generated. One or more modules are launched for execution on a computing device (block 402). The image module 114, for instance, may be included as part of an application 110, the operating system 108, and so on.

Responsive to the launch, criteria are generated automatically and without user intervention through execution of the one or more modules by a computing device (block 404). The criteria, for instance, may be selected using rules 218 to determine which criteria are to be used to identify potentially interesting images, including still and/or video images.

Images are curated using the generated criteria automatically and without user intervention through execution of the one or more modules. The curated images are identified from a plurality of different image sources that are associated with a user (block 406). The image module 114, for instance, may access a variety of different image sources 202 to curate the images. This may include identifying, obtaining, and organizing the images according to a layout as described in relation to FIG. 3.

The curated images are caused to be displayed by a display device of the computing device automatically and without user intervention through execution of the one or more modules (block 408). Continuing with the previous example, the curated images may be displaying upon launching of the application such that the images are displayed without user input beyond that of the launching of the application. In this way, a user is provided with an automated display of a collection of potentially interesting images. A variety of other examples are also contemplated.

Figure 5:
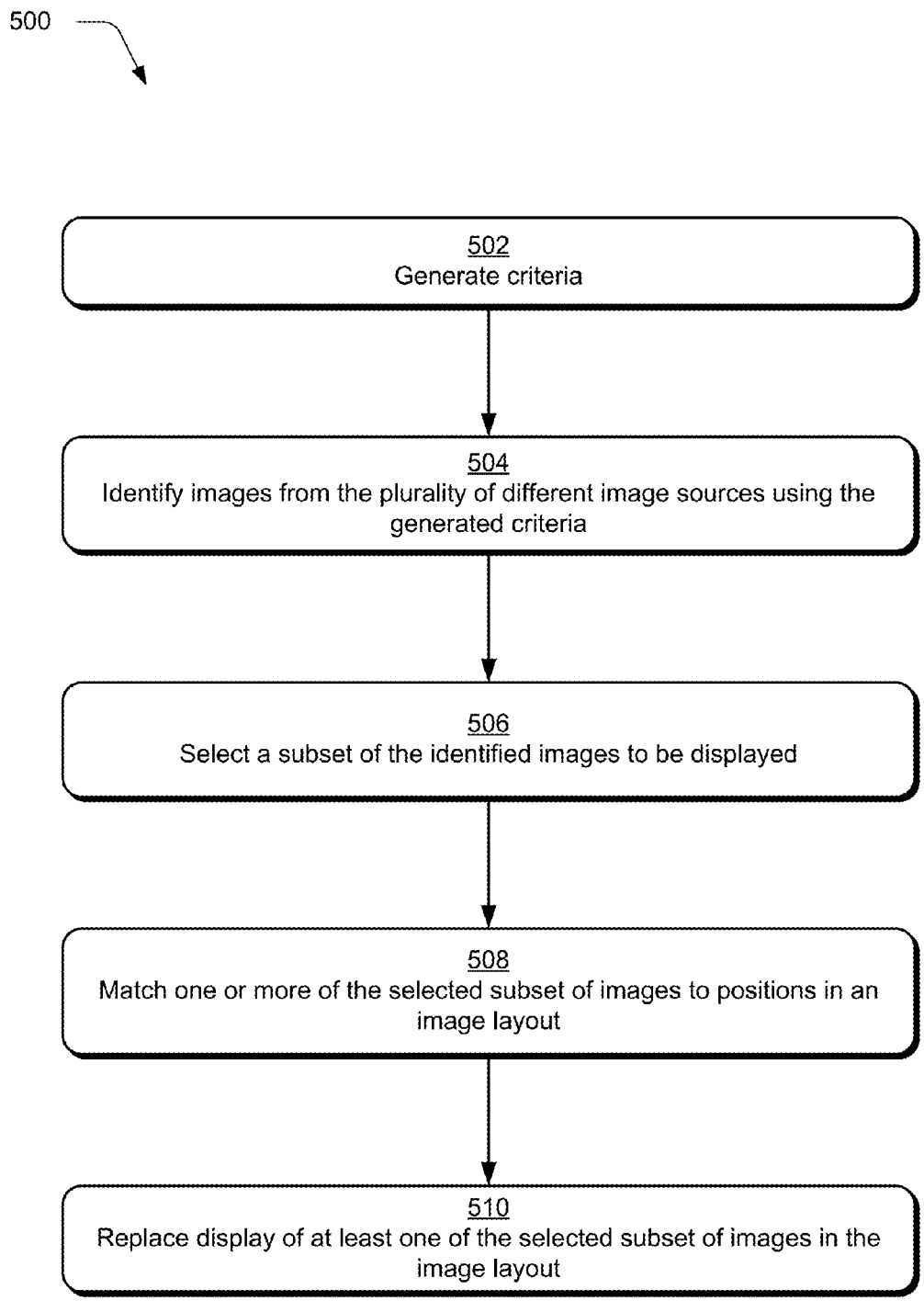
FIG. 5 is a flow diagram depicting a procedure in an example implementation in which a subset of identified images are matched to an image layout and replaced sequentially in time as part of a display of the layout.

FIG. 5 depicts a procedure 500 in an example implementation in which a subset of identified images are matched to an image layout and replaced sequentially in time as part of a display of the layout. Criteria are generated (block 502) automatically and without user intervention, such as through execution of a criteria generation module 216 as previously described in relation to FIG. 2.

Images are identified that are associated with a user from a plurality of different image sources using the generated criteria (block 504). Continuing with the previous example, the image identification module 220 may identify which images from the image sources 202 comply with the criteria generated by the criteria generation module 216.

A subset of the identified images is selected for display (block 506). This subset may be selected by the subset selection module 222 based on a variety of considerations as previously described. One or more of the selected subset of images are matched to positions in an image layout (block 508). Display of at least one of the selected subset of images in the image layout is replaced with another one of the selected subset of images (block 510). As shown in FIG. 3, for example, the image layout module 224 may assign images to particular locations of the image layout. These images may then be replaced sequentially in time at different locations of the layout to provide an active viewing experience. A variety of other examples are also contemplated.

Figure 6:
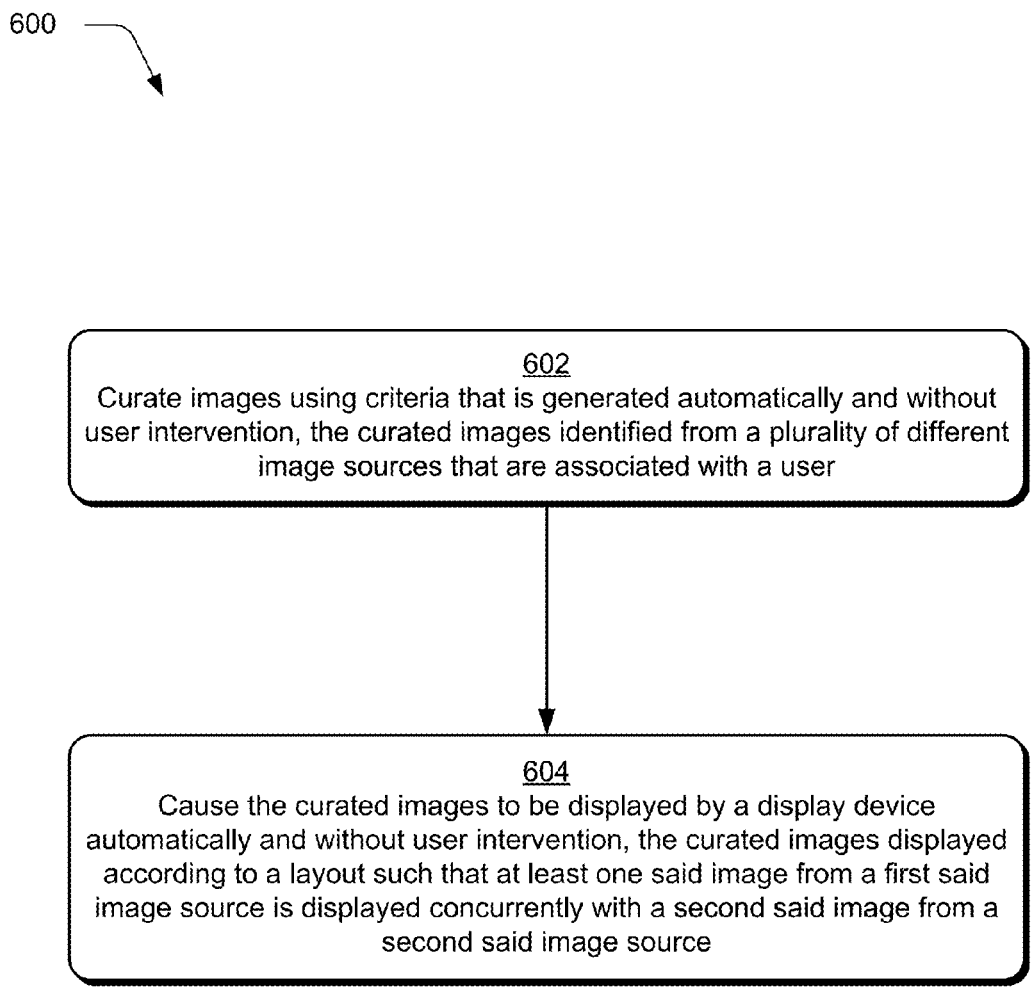
FIG. 6 is a flow diagram depicting a procedure in an example implementation in which images are curated using criteria that is automatically generated without user intervention.

FIG. 6 depicts a procedure in an example implementation in which images are curated using criteria that is automatically generated without user intervention. Images are curated using criteria that are generated automatically and without user intervention, the curated images identified from a plurality of different image sources that are associated with a user (block 602). The images may be curated, for instance, through execution of the image module 114 to identify and organize images for display in a user interface. As described in FIG. 2, these images may be obtained from a variety of different image sources 202.

The curated images are caused to be displayed by a display device automatically and without user intervention, the curated images displayed according to a layout such that at least one image from a first image source is displayed concurrently with a second image from a second image source (block 604). For example, an image may be obtained from local storage of the computing device 204, other computing devices associated with the user 206 (e.g., remote devices such as a user's phone), remote storage associated with the user 208, a photo sharing service 210, a user's social network accounts 212, images with tags identifying the user 214, and so forth. Another image may also be obtained, this one from a source that is different from the initial image. These images may then be displayed concurrently, such as in a "multi-up" layout as shown in FIG. 3 although a variety of other layout examples are also contemplated.

Example System and Device

FIG. 7 illustrates an example system generally at 700 that includes an example computing device 702 that is representative of one or more computing systems and/or devices that may implement the various techniques described herein. This is illustrated through incorporation of the image module 114 as part of the example computing device 702. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    launching an application comprising one or more modules for execution on a computing device;
    responsive to the launching, generating criteria automatically and without user intervention through execution of the application comprising the one or more modules by the computing device;
    responsive to the launching, curating images using the generated criteria automatically and without user intervention through execution of the application comprising the one or more modules, the curated images identified from a plurality of different image sources that are associated with a user; and
    responsive to the launching, causing the curated images to be displayed by a display device of the computing device automatically and without user intervention through execution of the application comprising the one or more modules, including displaying a description of at least one of the generated criteria used to identify at least one of the curated images being displayed by the display device.

2. A method as described in claim 1, wherein the application comprising the one or more modules are incorporated as part of an operating system and the launching is performed responsive to selection of an option by the user to output the curated images.

3. A method as described in claim 1, wherein the criteria specify an analysis of one or more pixels of corresponding said images that is to be performed.

4. A method as described in claim 1, wherein the criteria correspond to metadata associated with the images.

5. A method as described in claim 1, wherein the curating is performed through execution of the application comprising the one or more modules for at least one said image that is accessible remotely via a network to identify the at least one said image without downloading the at least one said image.

6. A method as described in claim 5, wherein the at least one said image is downloaded responsive to identification of the image using one or more said criteria.

7. A method as described in claim 1, wherein the curating of the images includes:
    identifying the images automatically and without user intervention from the plurality of different image sources using the generated criteria;
    selecting a subset of the identified images to be displayed automatically and without user intervention;
    matching one or more of the selected subset of images to positions in an image layout automatically and without user intervention; and
    replacing display of at least one of the selected subset of images in the image layout automatically and without user intervention.

8. A method as described in claim 7, further comprising generating additional criteria after passage of a predefined amount of time and curating additional images responsive to the generating of the additional criteria.

9. A method as described in claim 8, wherein the generation of the additional criteria is based at least in part on the criteria that was previously generated.

10. A method as described in claim 7, wherein the replacing is performed for a first said image in the layout and is not performed for a second said image in the layout at a same point in time, the first and second said images being displayed concurrently at a previous point in time.

11. A method as described in claim 1, wherein at least one of the image sources is accessible remotely via the network using credentials of the user that are stored on the computing device.

12. A method as described in claim 11, wherein the credentials are accessible upon login of the user to the computing device.

13. A method as described in claim 1, wherein the images include still images or video images.

14. One or more computer-readable storage memories comprising an application comprising instructions stored thereon that, responsive to execution by a computing device, causes the computing device to perform operations automatically and without user intervention, the operations comprising:

generating criteria responsive to initiating, without user intervention, execution of the application comprising the instructions;

responsive to the generating and without user intervention, identifying images that are associated with a user from a plurality of different image sources using the generated criteria;

responsive to the identifying and without user intervention, selecting a subset of the identified images for display;

responsive to the selecting and without user intervention, matching one or more of the selected subset of images to positions in an image layout; and responsive to the matching and without user intervention, replacing display of at least one of the selected subset of images in the image layout with another one of the selected subset of images, the image layout including a description of at least one of the generated criteria used to identify at least one image being displayed in the image layout.

15. One or more computer-readable storage memories as described in claim 14, wherein at least one of the criteria are based on people, time, or location.

16. One or more computer-readable storage memories as described in claim 14, wherein at least one of the criteria are people based on pixels included in the images.

17. One or more computer-readable storage memories as described in claim 14, wherein the application comprising the instructions are incorporated as part of an operating system.

18. A system comprising an application comprising one or more modules implemented at least partially in hardware, the application comprising the one or more modules configured to perform operations comprising:

responsive to the application comprising the one or more modules being launched, curating images using criteria that are generated automatically and without user intervention, the curated images identified from a plurality of different image sources that are associated with a user; and responsive to the application comprising the one or more modules being launched, causing the curated images to be displayed by a display device automatically and without user intervention, the curated images displayed according to a layout such that at least one said image from a first said image source is displayed concurrently with a second said image from a second said image source, the layout including a description of at least one of the generated criteria used to identify at least one of the curated images being displayed according to the layout.

19. A system as described in claim 18, wherein the layout does not include preconfigured borders that are visible to a user when viewing the layout.

20. A system as described in claim 19, wherein the layout does not include preconfigured borders that are visible to the user through arrangement of pixels of the first said image as adjacent to pixels of the second said image such that pixels from a source that is other than the first said image or the second said image are not displayed between the pixels of the first and second said images.

* * * * *